US006944627B2

(12) United States Patent
Zhang et al.

(10) Patent No.: US 6,944,627 B2
(45) Date of Patent: Sep. 13, 2005

(54) CONTENT MANAGEMENT SYSTEM AND METHODOLOGY EMPLOYING A TREE-BASED TABLE HIERARCHY FEATURING ARBITRARY INFORMATION RETRIEVAL FROM DIFFERENT LOCATIONS IN THE HIERARCHY

(75) Inventors: Howard Zhang, San Jose, CA (US); Li Ming Wang, Darnestown, MD (US); Lily L. Liang, San Jose, CA (US); Tawei Hu, San Jose, CA (US); Edward J. Perry, Cary, NC (US); Khanh M. Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/128,478

(22) Filed: Apr. 23, 2002

(65) Prior Publication Data

US 2003/0200224 A1 Oct. 23, 2003

(51) Int. Cl.[7] .............................................. G06F 17/30
(52) U.S. Cl. ................................................... 707/103 R
(58) Field of Search ........................ 707/1–9, 10, 102, 707/103 R; 709/203; 717/105, 108, 126; 715/853

(56) References Cited

U.S. PATENT DOCUMENTS

| 4,751,740 A | 6/1988 | Wright |
| 4,969,091 A | 11/1990 | Muller |
| 5,615,337 A | 3/1997 | Zimowski et al. |
| 5,644,768 A | 7/1997 | Periwal et al. |
| 5,742,810 A | 4/1998 | Ng et al. |
| 5,774,719 A | 6/1998 | Bowen |
| 5,778,398 A | 7/1998 | Nagashima et al. |
| 5,799,310 A | 8/1998 | Anderson et al. |

(Continued)

FOREIGN PATENT DOCUMENTS

WO    WO 99/22362    5/1999

OTHER PUBLICATIONS

Ege, R.K. et al., Using Java to add "stored procedures" to databases, Aug. 1999, Techinology of Object–oriented lanaguages and system tools 30, Sch. of Comp. Sci, Florida Int. Univ, pp. 322–331.*
Jeonghee Kim, Taissok Han, and Suk Kyoon Lee, "Visualization of Path Expressions in a Visual Object–Oriented Database Query Language," (2 pages).
Chien–I Lee, Ye–In Chang, and Wei–Pang Yang, "Design Of A New Indexing Organization For A Class–Aggregation Hierarchy In Object–Oriented Databases", Journal of Information Science and Engineering 15, 1999, pp. 217–241, Taiwan.
Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445–452.
Akira Kawaguchi, Daniel Lieuwen, Inderpal Mumick, Kenneth Ross, "Implementing Incremental View Maintenance in Nested Data Models" Database Programming Languages, 6th International Workshop, DBPL–6, Aug. 18–20, 1997 Proceedings, pp. 203–221.
Li Tian–Zhu, "Normalization of Nested Structure for Complex Objects" in Chinese, Journal of Software, vol. 9, No. 5, p. 390–396, May 1998, (with English Abstract).

*Primary Examiner*—Diane D. Mizrahi
(74) *Attorney, Agent, or Firm*—David W. Victor; Konrad Raynes & Victor LLP (57) ABSTRACT

A content management system is provided including a plurality of tables forming a tree-based storage hierarchy. The system includes a stored procedure which enables information to be retrieved from different arbitrary locations throughout the storage hierarchy. Advantageously, the system retrieves information from both simple and complex tree-based storage hierarchies.

23 Claims, 5 Drawing Sheets

U.S. PATENT DOCUMENTS

| | | |
|---|---|---|
| 5,819,252 A | 10/1998 | Benson et al. |
| 5,862,378 A | 1/1999 | Wang et al. |
| 5,875,332 A | 2/1999 | Wang et al. |
| 5,892,902 A | 4/1999 | Clark |
| 5,940,616 A | 8/1999 | Wang |
| 5,953,525 A * | 9/1999 | Glaser et al. ............... 717/105 |
| 5,956,036 A * | 9/1999 | Glaser et al. ............... 715/853 |
| 6,012,067 A | 1/2000 | Sarkar |
| 6,016,394 A | 1/2000 | Walker |
| 6,047,291 A | 4/2000 | Anderson et al. |
| 6,055,637 A | 4/2000 | Hudson et al. |
| 6,063,133 A | 5/2000 | Li et al. |
| 6,065,117 A | 5/2000 | White |
| 6,067,414 A | 5/2000 | Wang et al. |
| 6,088,524 A | 7/2000 | Levy et al. |
| 6,104,393 A | 8/2000 | Santos-Gomez |
| 6,128,621 A | 10/2000 | Weisz |
| 6,148,342 A | 11/2000 | Ho |
| 6,161,182 A | 12/2000 | Nadooshan |
| 6,167,405 A | 12/2000 | Rosensteel, Jr. et al. |
| 6,173,400 B1 | 1/2001 | Perlman et al. |
| 6,219,826 B1 | 4/2001 | De Pauw et al. |
| 6,233,586 B1 | 5/2001 | Chang et al. |
| 6,263,313 B1 | 7/2001 | Milsted et al. |
| 6,263,342 B1 | 7/2001 | Chang et al. |
| 6,272,488 B1 | 8/2001 | Chang et al. |
| 6,279,008 B1 * | 8/2001 | Tung Ng et al. ........... 707/102 |
| 6,279,111 B1 | 8/2001 | Jensenworth et al. |
| 6,282,649 B1 | 8/2001 | Lambert et al. |
| 6,289,344 B1 | 9/2001 | Braia et al. |
| 6,289,458 B1 | 9/2001 | Garg et al. |
| 6,292,936 B1 | 9/2001 | Wang |
| 6,308,274 B1 | 10/2001 | Swift |
| 6,314,449 B1 | 11/2001 | Gallagher et al. |
| 6,327,629 B1 | 12/2001 | Wang et al. |
| 6,338,056 B1 | 1/2002 | Dessloch et al. |
| 6,339,777 B1 | 1/2002 | Attaluri et al. |
| 6,343,286 B1 | 1/2002 | Lee et al. |
| 6,550,057 B1 * | 4/2003 | Bowman-Amuah ......... 717/126 |
| 6,578,068 B1 * | 6/2003 | Bowman-Amuah ......... 709/203 |
| 6,601,234 B1 * | 7/2003 | Bowman-Amuah ......... 717/108 |
| 6,636,845 B2 * | 10/2003 | Chau et al. .................... 707/1 |
| 6,643,633 B2 * | 11/2003 | Chau et al. .................... 707/1 |
| 2001/0002486 A1 | 5/2001 | Kocher et al. |
| 2001/0008015 A1 | 7/2001 | Vu et al. |
| 2001/0019614 A1 | 9/2001 | Madoukh |

* cited by examiner

CONTENT MANAGEMENT SYSTEM AND METHODOLOGY EMPLOYING A TREE-BASED TABLE HIERARCHY FEATURING ARBITRARY INFORMATION RETRIEVAL FROM DIFFERENT LOCATIONS IN THE HIERARCHY

CROSS REFERENCE TO RELATED PATENT APPLICATIONS

This patent application relates to U.S. patent application, Ser. No. 10/128,450 entitled Content Management System and Methodology Employing a Tree-Based Table Hierarchy Which Accommodates Opening a Dynamically Variable Number of Cursors, the disclosure of which is incorporated herein by reference.

FIELD OF THE INVENTION

The disclosures herein relate generally to databases and more particularly to methods and apparatus for accessing information stored in content management systems.

BACKGROUND

Figure 1A:
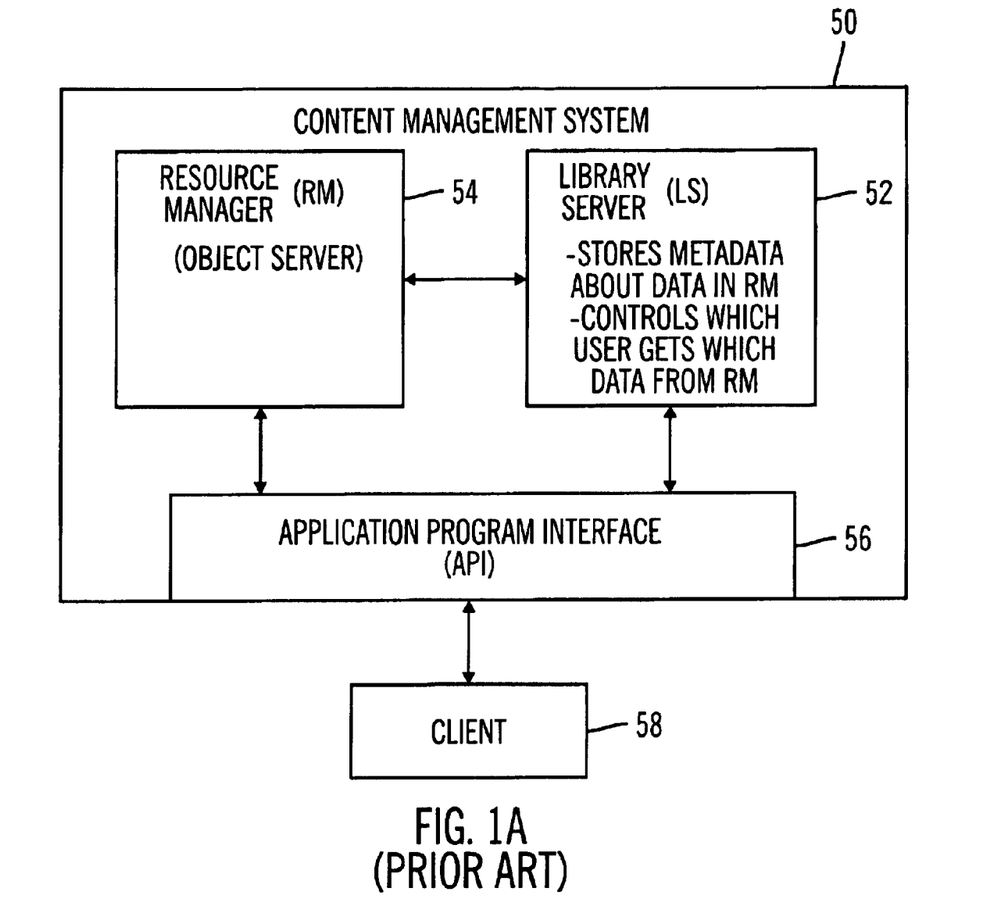
FIG. 1A is a high level block diagram of a conventional content management system showing both server and client.

Conventional content management systems 50, such as that shown in FIG. 1A, typically include a Library Server (LS) 52, one or more Resource Managers (RMs) 54 and a client access application program interface (API) 56. A client 58 is coupled by a network to the API 56 and seeks information stored in the Resource Manager 54. The Library Server 52 stores metadata relating to all objects or data stored in the Resource Manager 54. The Library Server 52 also controls the particular objects that a particular client user can access. Client 58 users can submit requests known as queries through the API 56 to search or retrieve metadata stored in the Library Server 52 or objects stored in the Resource Manager 54.

Figure 1B:
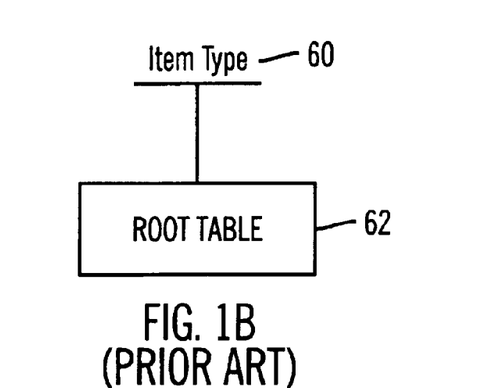
FIG. 1B is a representation of a flat storage data model showing one root table.

One approach employed to store items in a content management system is to model an item in a single table. Unfortunately, such as single table approach results in many fields among the rows and columns of the table being unused. Such an approach is inefficient from the storage viewpoint. In the past, flat data models have been used to store data in a content management system. For example, FIG. 1B shows an Item Type 60 which is represented by one root table 62 to form such a flat data storage model.

What is needed is a methodology and apparatus for providing a superior manner of storing and retrieving information in a content management system through the use of improved table structures.

SUMMARY

The disclosure herein involves a content management system which employs a hierarchical item type tree-based structure including tables at different levels to store metadata for items. A principal advantage of the embodiment disclosed herein is the ability to arbitrarily select or group component tables forming a complex tree-based structure and to then retrieve items therefrom in response to a query.

In one embodiment of the disclosed methodology, a method is provided for organizing information in a content management system including the step of creating a database including a root table and at least one child table together forming a tree hierarchy which stores information. The method also includes providing a stored procedure for accessing a selected arbitrary portion of the tree hierarchy.

DETAILED DESCRIPTION

Figure 2:
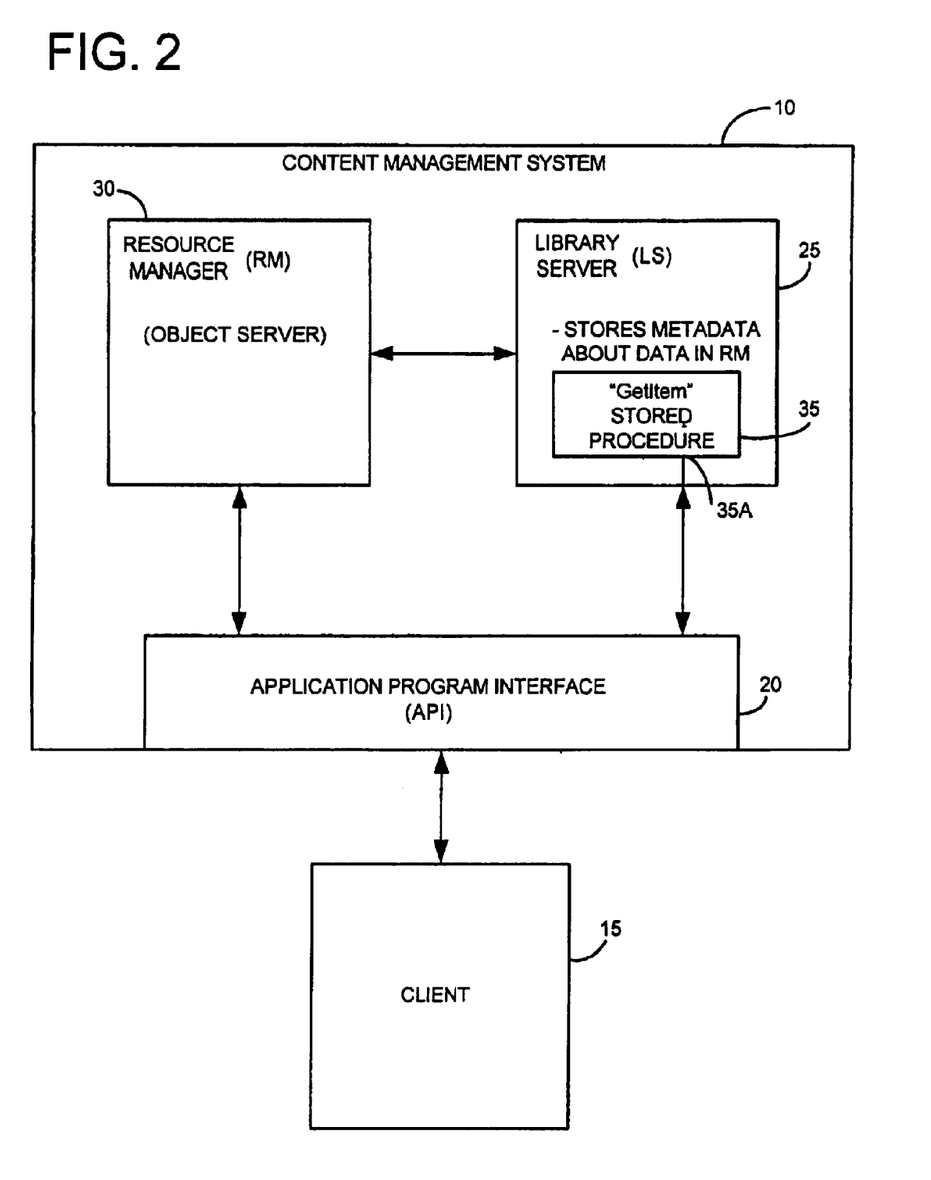
FIG. 2 is a block diagram of one embodiment of the content management system.

FIG. 2 is a block diagram of one embodiment of content management system 10. A client computer 15 is coupled to content management system 10 via the system's application program interface (API) 20. A library server (LS) 25 is coupled to API 20 and receives queries from client 15. These queries seek information which is stored in library server 25 and/or resource manager 30. Library server 25 is coupled to resource manager 30 and contains metadata concerning the data or objects that are stored in resource manager 30. Many types of data can be stored in resource manager 30, for example, business information, applications, operating systems, text, audio, video and streaming data, just to name a few.

Figure 3A:
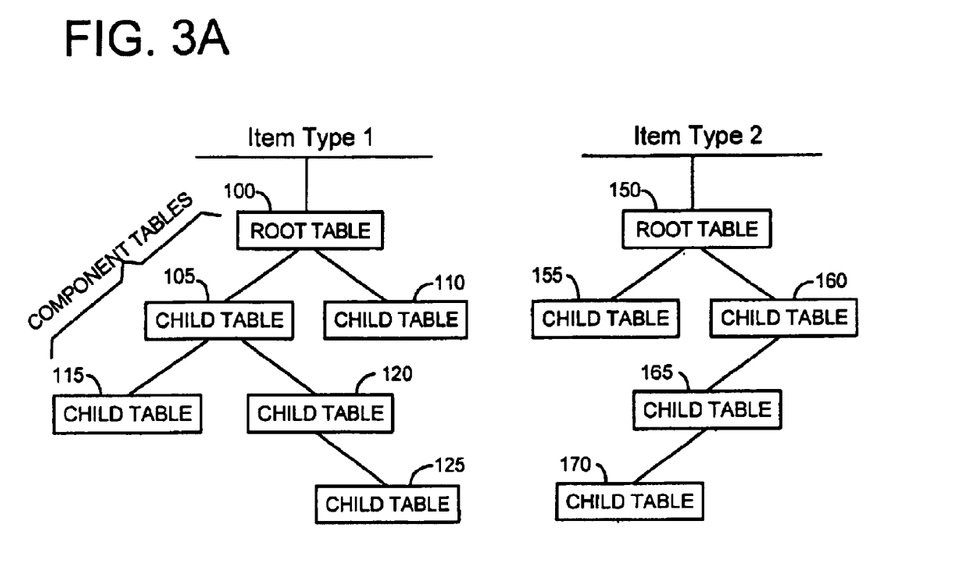
FIG. 3A shows two representation complex tree structure data storage hierarchies as Item Type 1 and Item Type 2.

Content manage system 10 employs a hierarchical item type tree structure in terms of a group of component tables (or views) at different levels to store metadata for items. A "GetItem" Stored Procedure 35 in library server 25 is used to arbitrarily select or group the component tables (or views) from a complex tree structure and then retrieve item information from selected component tables. Such a complex tree structure is shown in FIG. 3A which depicts a tree structure for Item Type 1 and another tree structure for Item Type 2. More particularly, the Item Type 1 tree structure includes a root table 100 with child tables 105 and 110 extending therefrom. In turn, child tables 115 and 120 extend from child table 105. Child table 125 extends from child table 120. In this example, root table 100 and child tables, 105, 110, 115, 120 and 125 are component tables. Together all of these tables form a complex tree hierarchy for Item Type 1.

A second complex tree structure data storage hierarchy is shown in FIG. 3A as Item Type 2. The Item Type 2 tree structure includes a root table 150 with child tables 155 and 160 extending therefrom. Child table 165 extends from child table 160 and child table 170 extends from child table 165. In this example, root table 150 and child tables, 150, 155, 160, 165 and 170 are component tables. Together all of these tables form the complex tree hierarchy of Item Type 2.

Figure 3B:
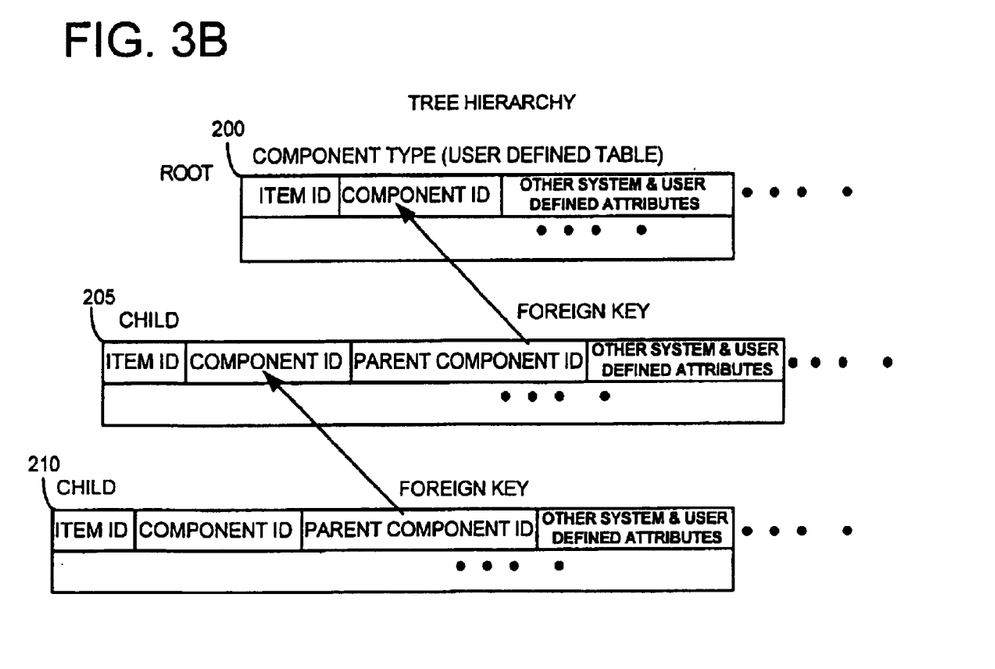
FIG. 3B is a more detailed representation of tables within a tree hierarchy.

FIG. 3B illustrates a representative tree hierarchy in more detail. This tree hierarchy includes a user-defined component table 200 alternatively called a root table. Table 200 includes the columns ITEM ID, COMPONENT ID, and other system and user defined columns. The ellipses indicate that the table can extend further both vertically and horizontally from the representative portion shown. A child table 205 extends from root table 200 and includes a COMPONENT ID column and a PARENT COMPONENT ID column. The PARENT COMPONENT ID column is a foreign key that points back to a particular unique COMPONENT ID in root table 200. Another child table 210 extends from child table 205 and includes a COMPONENT ID column and a PARENT COMPONENT ID column. The PARENT COMPONENT ID column is a foreign key that points back to a particular unique COMPONENT ID in child table 205. A representative multi-level tree-based data storage hierarchy is thus shown in FIG. 3B.

Figure 4:
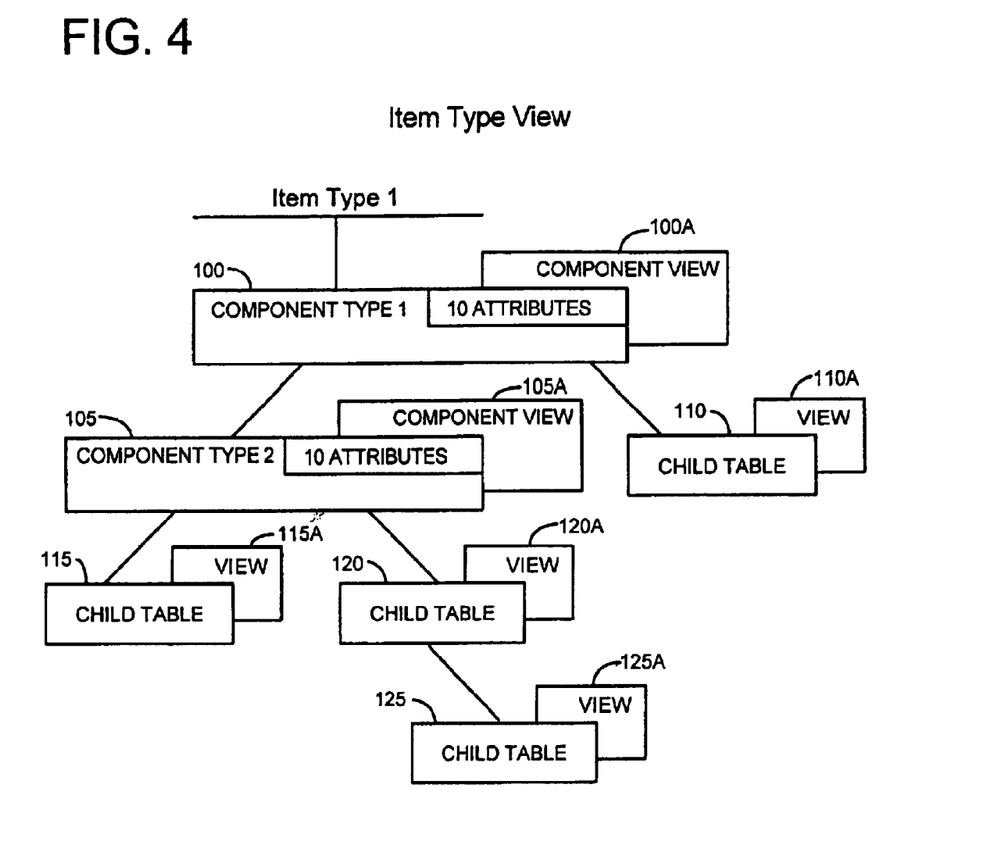
FIG. 4 shows a representative multi-level tree structure data storage hierarchy including views thereof in more detail.

FIG. 4 is a more detailed representation of the tree hierarchy shown in FIG. 3A as Item Type 1. It is often desirable to mask certain portions of a database from certain users. A "view" function is used to achieve this end. For example, it might be desirable for a particular database user to have access to another employee's home address but not their salary information. Views are used to accomplish this task. In FIG. 4 such views are shown as component view 100A, component view 105A, child view 110A, child view 115A, child view 120A and child view 125A.

Returning to FIG. 2, the GetItem stored procedure 35 allows application users to arbitrarily select a group of component tables (or views) from any hierarchical levels within an item type (or item type view). Advantageously, this feature allows skipping levels in the tree hierarchy and/or skipping of siblings of the selected component table or component tables. Moreover, in an operational scenario where there are several item types (or item type views) in tree structures, users may select or group component tables (or views). The user can then retrieve items in a similar fashion in several different item types (or item type views) simultaneously.

Figure 5:
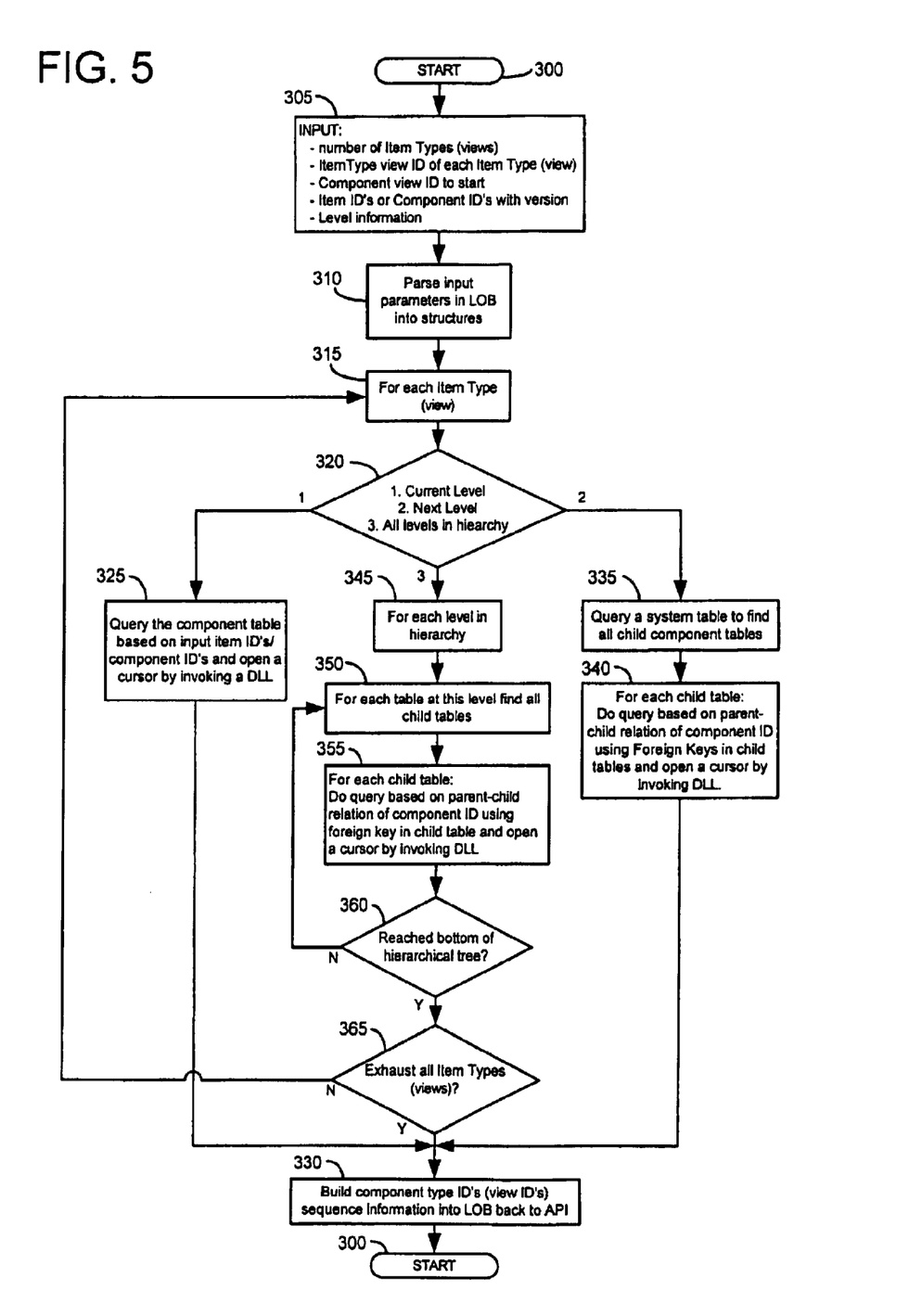
FIG. 5 is a flowchart showing more detail regarding the operation and capabilities of the GetItem Stored Procedure (GetItem SP) employed to retrieve information from arbitrary locations within a tree-based data storage hierarchy.

FIG. 5 is a flowchart showing more detail regarding the operation and capabilities of the GetItem Stored Procedure (GetItem SP) 35. GetItem SP 35 begins at start block 300. At block 305 the following inputs are provided to GetItem SP 35: 1) the number of Item Types (or views), 2) the Item Type ID or Item Type View ID of each Item Type (or view), 3) Component Type (or Component View) to start, 4) Item ID's or Component ID's with version information, and 5) Level Information. The above input parameters are parsed from LOB into structures at block 310. LOB is a large object which is a data type used in DB2 to manage unstructured date. A "For Each Item Type (view)" loop is commenced at block 315. At decision block 320 a determination is made regarding at which level the subject of the current input query request is located, namely 1) the current level, 2) the next level, or 3) all levels of the hierarchy.

If a determination is made that the subject of the current input query is the current level, then process flow continues to block 325. A query of the component table is then conducted based on the input item ID's/component ID's. A cursor is opened using a dynamic linked library (DLL). Process flow then continues to block 330 where the system builds component type ID's (view ID's) sequence information into an LOB and sends the LOB back to the client 15 via API 20. Then process flow continues back to start block 300.

If a determination is made at decision block 320 that the subject of the current input query is the next level of the tree hierarchy, then process flow continues to block 335. A query is then conducted of a system table to find all child component tables forming the next level. At block 340, for each child table, a "Do query" is performed based on the parent child relation of the component ID using foreign keys in the child tables. A cursor is opened by invoking a DLL as described earlier. Process flow then continues to block 330 where the system builds component type ID's (view ID's) sequence information into an LOB and sends the LOB back to the client 15 via API 20. Then process block continues back to start block 300.

However, if a determination is made at decision block 320 that all levels in the tree hierarchy are the subject of the current input query, then process flow continues to block 345. Note that a "for loop" within a "for loop" within still another "for loop" follows. More particularly, for each level in the tree hierarchy (345), for each table at this level all child tables are found (350) and for each of these child tables a query is performed (355) based on the parent-child relation of the component ID using the foreign key in the child table. A cursor is opened by invoking a DLL as earlier described. A determination is then made at decision block 360 to see if the bottom of the hierarchical tree has been reached. If the bottom of the tree has not been reached, then process flow continues back to block 350 at which GetItem SP 35 continues to cycle through levels. When decision block 360 ultimately determines that the bottom of the hierarchical tree has been reached, then process flow continues to decision block 365. Decision block 365 checks to see if all Item Types (views) have been exhausted. If all Item Types (views) have not been exhausted than process flow continues back to block 315 where GetItem SP 35 cycles or moves on to the next Item Type (or view). However, when decision block 365 ultimately determines that all Item Types (or views) have been exhausted, then process flow continues to block 330. At block 330 the system builds component type ID's (view ID's) sequence information into an LOB and sends the LOB back to the client 15 via API 20.

In summary, to permit GetItem SP 35 to arbitrarily select or group the component tables (or views) from different hierarchical levels of the tree vertically and across several item types or item type views horizontally, "GetItem" stored procedure 35 is responsive to data at its input 35A which 1) instructs GetItem SP 35 to retrieve items from a particular component table (or view) at any hierarchical level; 2) instructs GetItem SP 35 to retrieve items from all next-level child tables (or views) belonging to a specified component table (view) at any hierarchical level; and 3) instructs GetItem SP 35 to retrieve items from a specified component table (or view) and all of its child tables (or views) of all hierarchical levels below.

Moreover, a list of item types (or multiple item types) or item type view ID's can also be provided as input to GetItem SP 35. Each ID can be repeated several times. It is noted that the number of the Item Type, or Item Type view IDs (sNumOf ItemType ViewID) should be specified as an input to GetItem SP 35. For example, a representative input ID to GetItem SP 35 could be "ItemTypeView 1, ItemTypeView 1, and ItemTypeView2) wherein ItemTypeView 1 appears twice. In this particular example, the input for sNumOf ItemType would be 3.

The combination of GetInfo SP 35 input and sLevel and the list of item types or item type view IDs (including the repeated IDs) during an invocation of the GetItem SP provides application users with the ability to arbitrarily select component tables in multiple hierarchical structures.

In conclusion, when the GetItem 35 stored procedure is invoked and provided with the following data from a query from the client 1) number of Item Types (Item Type views; 2) Item Type ID (or Item Type View ID) for each Item Type (or view) 3) Component Type (or component view)—a starting point, 4) Item ID or Component ID and 5) Level (current level, immediate child or all children below), the disclosed content management system and methodology permit the user to locate information in virtually any arbitrary location in the often complex tree hierarchy which stores data in the system.

The disclosed content management system methodology and apparatus advantageously solves the problem of accessing information in a complex tree-based table data hierarchy. The content management system can be stored on virtually any computer-readable storage media, such as CD, DVD and other magnetic and optical media in either compressed or non-compressed form. Of course, it can also be stored on a server computer system or other information handling system.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A computer implemented method of organizing information in a content management system comprising:

creating a database including a plurality of root tables, wherein each root table is for one item type of items in a resource manager and wherein each root table is capable of being associated with at least one child table together forming a tree hierarchy which stores information on the items in the resource manager; and providing a stored procedure for accessing a selected root table or child table portion of the tree hierarchy.

2. The computer implemented method of claim 1, further comprising:

providing a number of item types as an input to the stored procedure, wherein the stored procedure accesses the input number of root tables associated with item types.

3. The computer implemented method of claim 1, further comprising:

providing an item type ID as an input to the stored procedure, wherein the stored procedure accesses the root table associated with the input the item type ID.

4. The computer implemented method of claim 1, further comprising:

providing a component type ID as an input to the stored procedure as a starting point, and wherein the stored procedure accesses child tables having the input component type ID.

5. The computer implemented method of claim 1, further comprising:

providing an item ID with version information as an input to the stored procedure.

6. The computer implemented method of claim 1, further comprising:

providing a component ID with version information as an input to the stored procedure.

7. The computer implemented method of claim 1, further comprising:

providing level information as an input to the stored procedure, wherein the stored procedure accesses child tables at the input level from the root table.

8. The computer implemented method of claim 1, wherein creating the database comprises creating each root table to include entries, wherein each entry comprises one item identifier identifying one item in the resource manager and a component identifier, and wherein each child table of the root table has entries comprising an item identifier identifying one item in the resource manager, a parent component identifier indicating the component identifier of the root table, and a child component identifier.

9. The computer implemented method of claim 8, wherein creating the database further comprising creating an additional child table having entries comprising an item identifier identifying one item in the resource manager, a parent component identifier indicating one parent component identifier indicating the component identifier of one child table, and a child component identifier.

10. The computer implemented method of claim 1, wherein at least one root table and child table comprise view tables, wherein the view tables are associated with view functions that mask certain tables from certain users.

11. A computer readable program product for organizing information in a content management system, the computer program product including a plurality of computer executable instructions stored on a computer readable medium, wherein the instructions, when executed by the content management system, cause the system to perform:

creating a database including a plurality of root tables, wherein each root table is for one item type of items in a resource manager and wherein each root table is capable of being associated with at least one child table together forming a tree hierarchy which stores information on the items in the resource manager; and providing a stored procedure for accessing a selected root table or child table portion of the tree hierarchy.

12. The computer readable program product of claim 11 wherein the computer readable medium is an optical disk.

13. The computer readable program product of claim 11 wherein the computer readable medium is a magnetic disk.

14. The computer readable program of claim 11, wherein creating the database comprises creating each root table to include entries, wherein each entry comprises one item identifier identifying one item in the resource manager and a component identifier, and wherein each child table of the root table has entries comprising an item identifier identifying one item in the resource manager, a parent component identifier indicating the component identifier of the root table, and a child component identifier.

15. The computer readable program of claim 14, wherein creating the database further comprising creating an additional child table having entries comprising an item identifier identifying one item in the resource manager, a parent component identifier indicating one parent component identifier indicating the component identifier of one child table, and a child component identifier.

16. The computer readable program of claim 11, wherein at least one root table and child table comprise view tables, wherein the view tables are associated with view functions that mask certain tables from certain users.

17. A computer implemented content management system comprising:

an information storage facility including a database having a plurality of root tables, wherein each root table is for one item type of items in a resource manager and wherein each root table is capable of being associated with at least one child table together forming a tree hierarchy which stores information on the items in the resource manager; and a stored procedure coupled to the database for accessing a selected root table or child table portion of the tree hierarchy.

18. A computer implemented content management system comprising:

a resource manager for storing objects;

a library server, coupled to the resource manager, for storing metadata regarding objects in the resource manager, the library server including a database having a plurality of root tables, wherein each root table is for one item type of items in a resource manager and wherein each root table is capable of being associated with at least one child table together forming a tree hierarchy which stores information on the items in the resource manager; and a stored procedure coupled to the database for accessing a selected arbitrary portion of the tree hierarchy.

19. The computer implemented content management system of claim 18 further comprising an application program interface coupled to the library server and the resource manager.

20. The computer implemented content management system of claim 18 further comprising a client coupled to the application program interface.

21. The computer implemented content management system of claim 18, wherein the root table include entries, wherein each entry comprises one item identifier identifying one item in the resource manager and a component identifier, and wherein each child table of the root table has entries comprising an item identifier identifying one item in the resource manager, a parent component identifier indicating the component identifier of the root table, and a child component identifier.

22. The computer implemented content management system of claim 21, wherein the database further includes an additional child table having entries comprising an item identifier identifying one item in the resource manager, a parent component identifier indicating one parent component identifier indicating the component identifier of one child table, and a child component identifier.

23. The computer implemented content management system of claim 18, wherein at least one root table and child table comprise view tables, wherein the view tables are associated with view functions that mask certain tables from certain users.

* * * * *